United States Patent
Kim et al.

(10) Patent No.: US 8,896,571 B2
(45) Date of Patent: Nov. 25, 2014

(54) TOUCH PANEL

(71) Applicant: Samsung Electro-Mechanics Co., Ltd., Suwon (KR)

(72) Inventors: Hyun Jun Kim, Suwon (KR); Kyung Hee Hong, Suwon (KR); Shin Hwan Hwang, Suwon (KR); Tah Joon Park, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/845,028

(22) Filed: Mar. 17, 2013

(65) Prior Publication Data

US 2014/0184527 A1  Jul. 3, 2014

(30) Foreign Application Priority Data

Dec. 28, 2012 (KR) .................. 10-2012-0157260

(51) Int. Cl.
G09G 5/00 (2006.01)
G06F 3/041 (2006.01)

(52) U.S. Cl.
CPC ..................................... *G06F 3/041* (2013.01)
USPC ....................................... 345/174; 178/18.06

(58) Field of Classification Search
CPC .................. G06F 3/0418; G06F 3/044; G06F 2203/04112; G06F 3/041
USPC ........................ 345/174; 178/18.06
See application file for complete search history.

(56) References Cited

U.S. PATENT DOCUMENTS

| | | | |
|---|---|---|---|
| 2006/0203403 A1* | 9/2006 | Schediwy et al. | 361/56 |
| 2009/0194344 A1* | 8/2009 | Harley et al. | 178/18.06 |
| 2011/0242050 A1 | 10/2011 | Byun et al. | |
| 2012/0044198 A1* | 2/2012 | Chai et al. | 345/174 |
| 2013/0154966 A1* | 6/2013 | Kim et al. | 345/173 |
| 2013/0207924 A1* | 8/2013 | Mohindra et al. | 345/174 |
| 2013/0271160 A1* | 10/2013 | Solven et al. | 324/661 |
| 2013/0271161 A1* | 10/2013 | Solven et al. | 324/661 |
| 2014/0022466 A1* | 1/2014 | Lo et al. | 349/12 |

FOREIGN PATENT DOCUMENTS

KR  10-2010-0032283  3/2010
KR  10-2010-0084919  7/2010

OTHER PUBLICATIONS

Office Action dated Mar. 20, 2014 for corresponding Korean Patent Application No. 10-2012-0157260 and its English summary provided by Applicant's foreign counsel.

* cited by examiner

*Primary Examiner* — Tom Sheng
(74) *Attorney, Agent, or Firm* — Ladas & Parry, LLP

(57) ABSTRACT

Disclosed herein is a capacitive touch panel having a single layer electrode structure capable of securing uniformity of capacitance distribution by decreasing capacitive coupling which may be caused by a generation of undesirable parasitic capacitance between short-range electric field lines by a sensing electrode and a ground electrode adjacent to the sensing electrode employing a mutually inclined concave and convex part toward the sensing electrode and by the sensing electrode and an adjacent driving electrode having a interdigit structure formed in the same method, in a mutual capacitive type touch panel that configures together the driving electrode and the sensing electrode on a single electrode layer having a matrix structure in which a plurality of electrodes are arranged to be intersected with each other on a base substrate.

12 Claims, 2 Drawing Sheets

TOUCH PANEL

CROSS REFERENCE TO RELATED APPLICATION

This application claims the benefit of Korean Patent Application No. 10-2012-0157260, filed on Dec. 28, 2012, entitled "Touch Panel", which is hereby incorporated by reference in its entirety into this application.

BACKGROUND OF THE INVENTION

1. Technical Field

The present invention relates to a touch panel.

2. Description of the Related Art

In accordance with the growth of computers using a digital technology, devices assisting computers have also been developed, and personal computers, portable transmitters and other personal information processors execute processing of text and graphics using a variety of input devices such as a keyboard and a mouse.

While the rapid advancement of an information-oriented society has been widening the use of computers more and more, it is difficult to efficiently operate products using only a keyboard and mouse currently serving as an input device. Therefore, the necessity for a device that is simple, has minimum malfunction, and is capable of easily inputting information has increased.

In addition, current techniques for input devices have progressed toward techniques related to high reliability, durability, innovation, designing and processing beyond the level of satisfying general functions. To this end, a touch panel has been developed as an input device capable of inputting information such as text, graphics, or the like.

This touch panel is mounted on a display surface of an image display device such as an electronic organizer, a flat panel display device including a liquid crystal display (LCD) device, a plasma display panel (PDP), an electroluminescence (El) element, or the like, or a cathode ray tube (CRT) to thereby be used to allow a user to select desired information while viewing the image display device.

Meanwhile, a mutual capacitive type touch panel obtains a coordinate of a contacting point by measuring change in a capacitance between two kinds of electrode patterns and an input unit, wherein the capacitance which is changed by an actual user shows a value higher or lower than an actual value due to a parasitic capacitance which may be generated between short-distance electric field lines at an undesirable position while a capacitance change is generated by the above-mentioned electrode patterns, such that reliability of touch recognition on a touch screen is decreased. In addition, as described in the following US Patent Laid-Open Publication No. 20110242050, the touch panel has a problem that cannot but be solved by adding separate component or adding a circuit design in order to remove the parasitic capacitance which cannot but be generated at the undesirable portion.

PRIOR ART DOCUMENT

Patent Document (Patent Document 1) US 20110242050 A1

SUMMARY OF THE INVENTION

The present invention has been made in an effort to provide a touch panel having a single layer electrode structure capable of contributing to an improvement of uniformity of capacitance distribution by decreasing capacitive coupling caused by parasitic capacitance which is an undesirable capacitance between short-range electric field lines by a structure change of a ground electrode of a touch screen.

Further, the present invention has been made in an effort to provide a touch panel having a single layer electrode structure in which a sensing electrode formed of a metal mesh electrode and a ground electrode adjacent to the sensing electrode have a mutually inclined concave and convex part toward the sensing electrode and the sensing electrode forms an interdigit structure using the same method as an adjacent driving electrode in a mutual capacitive type together configuring the driving electrode and the sensing electrode on a single electrode layer using a method in which one electrode group divides a counterpart electrode and each of the divided electrodes is wired by a separate inner connection wiring so as to be connected to one another at the outside of a view area in a matrix structure in which a plurality of electrodes are arranged to be intersected with each other on a base substrate.

According to a preferred embodiment of the present invention, there is provided a touch panel, including: a base substrate; a driving electrode including a first member formed on the base substrate in one direction and second members each extended in a direction perpendicular to one direction of the first member and formed to be spaced apart from each other in one direction; a sensing electrode including a third member formed in a direction corresponding to the first member and a fourth member extended to an inner portion of a spaced space between the second members in one side direction perpendicular to one direction in which the third member is formed; and a ground electrode formed in the other side direction of the third member so as to be in parallel with the direction in which the third member is formed and having a mutually inclined concave and convex part formed at a surface thereof corresponding to the third member.

The inclined concave and convex part may include a concave part formed toward an inner side of one side direction of the third member; and a protrusion part protruded from the ground electrode so as to correspond to the concave part.

The touch panel may further include: a protrusion protruded to have a width smaller than an extension width of the second member in a direction in which the second member is extended; and a concave part formed toward an inner side of the first member so as to correspond to the protrusion.

The touch panel may further include an inner wiring formed at one side of the ground electrode and formed at the other side of the third member in one direct in which the third member is formed.

The sensing electrode and the driving electrode may be formed in a mesh pattern.

The mesh pattern may be made of copper (Cu), aluminum (Al), gold (Au), silver (Ag), titanium (Ti), palladium (Pd), chromium (Cr), or a combination thereof.

The base substrate may use any one of polyethylene terephthalate (PET), polycarbonate (PC), poly methyl methacrylate (PMMA), polyethylene naphthalate (PEN), polyethersulfone (PES), a cyclic olefin polymer (COC), a triacetylcellulose (TAC) film, a polyvinyl alcohol (PVA) film, a polyimide (PT) film, polystyrene (PS), biaxially oriented polystyrene (BOPS; containing K resin), glass, or tempered glass.

The concave part may be formed to have a width that becomes narrower toward the extension direction of the fourth member, and the protrusion part is formed to have a width that becomes narrower toward a direction in which it is inserted into the concave part so as to correspond to the concave part.

The sensing electrode and the driving electrode may include insulating patterns formed to be spaced apart from each other so as to be insulated therebetween.

The mesh pattern may include a disconnection part for electrically insulating between the sensing electrode and the driving electrode.

A sensing electrode and a driving electrode having the same patterns as those of the sensing electrode and the driving electrode may be formed at the other side of the ground electrode based on the inner wiring, and the inner wiring may be formed to be electrically connected to the driving electrode having the same pattern.

The inner wiring may be formed by printing using an Ag paste.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
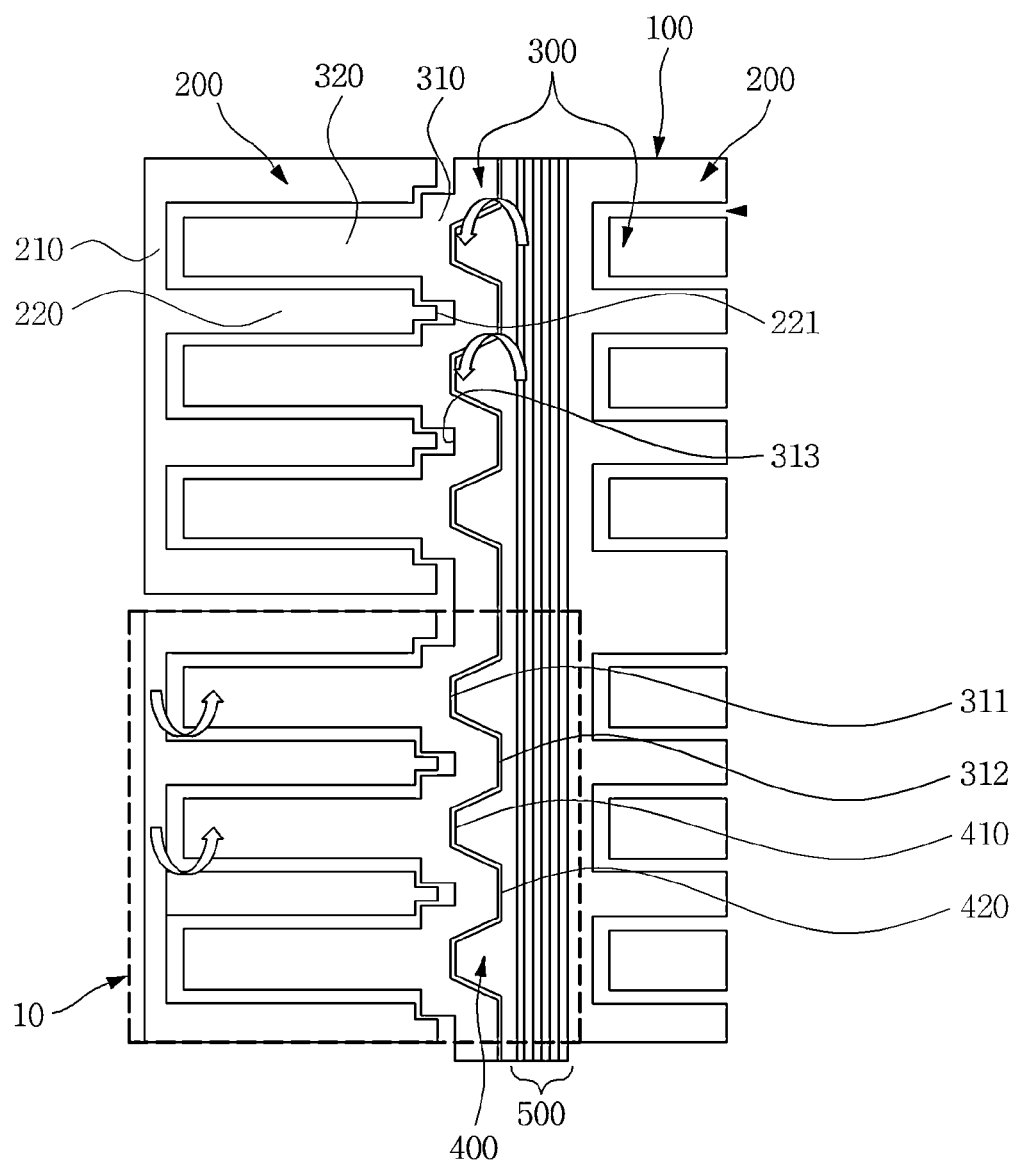
FIG. 1 is a plan view extracting a part of a capacitive touch screen having a single layer electrode structure according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
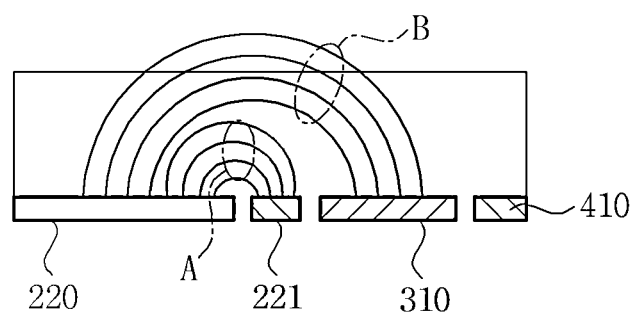
FIG. 2 shows a cross-sectional view showing the capacitive touch screen having the single layer electrode structure according to the preferred embodiment of the present invention.

FIG. 1 is a plan view extracting a part of a capacitive touch screen having a single layer electrode structure according to a preferred embodiment of the present invention and FIG. 2 shows a cross-sectional view showing the capacitive touch screen having the single layer electrode structure according to the preferred embodiment of the present invention.

A touch panel according to a preferred embodiment of the present invention may include a base substrate 100, a driving electrode 200 including a first member 210 formed on the base substrate 100 in one direction and second members 220 each extended in a direction perpendicular to one direction of the first member 210 and formed to be spaced apart from each other in one direction, a sensing electrode 300 including a third member 310 formed in a direction corresponding to the first member 210 and a fourth member 320 extended to an inner portion of a spaced space between the second members 220 in one side direction perpendicular to one direction in which the third member 310 is formed, and a ground electrode 400 formed in the other side direction of the third member 310 so as to be in parallel with the direction in which the third member 310 is formed and having a mutually inclined concave and convex part formed at a surface thereof corresponding to the third member 310.

The base substrate 100 serves to provide an area in which electrode patterns formed of the sensing electrode and the driving electrode 200, and an electrode wiring for electrically connecting between the electrode patterns are to be formed. Here, the base substrate 100 is partitioned into an active area and a bezel area, wherein the active area is a portion in which the electrode pattern is formed so that a touch of an input unit may be recognized and is included at a center of a transparent substrate, and the bezel area is a portion in which the electrode wiring for conducting with the electrode pattern is formed and is included at an edge of the active area. Here, the base substrate 100 needs to have support force capable of supporting the electrode pattern and the electrode wiring and transparency capable of allowing a user to recognize an image provided by an image display device. In consideration of the support force and the transparency described above, the transparent substrate may be made of polyethylene terephthalate (PET), polycarbonate (PC), poly methyl methacrylate (PMMA), polyethylene naphthalate (PEN), polyethersulfone (PES), a cyclic olefin polymer (COC), a triacetylcellulose (TAC) film, a polyvinyl alcohol (PVA) film, a polyimide (PI) film, polystyrene (PS), biaxially oriented polystyrene (BOPS; containing K resin), glass, tempered glass, or the like, but is not necessarily limited thereto.

The driving electrode 200 includes the first member 210 formed on the base substrate 100 in one direction and second members 220 each extended in a direction perpendicular to one direction of the first member 210 and formed to be spaced apart from each other in one direction, as shown in FIG. 1. In order to drive a touch panel having a single layer structure, by including the second members 220 each extended in a direction perpendicular to one direction of the first member 210 and formed to be spaced apart from each other in one direction, together with the first member 210, the sensing electrode 300 to be described below is formed in the spaced space between the second members 220, thereby making it possible to implement the touch panel having the single layer structure. Although the driving electrode 200 may be made of a material having conductivity and may be made be a transparent electrode material, it may also be made of an opaque metal material in order to use a mesh pattern.

Therefore, the driving electrode 200 may be formed in a mesh pattern using copper (Cu), aluminum (Al), gold (Au), silver (Ag), titanium (Ti), palladium (Pd), chromium (Cr), or a combination thereof. In this case, the driving electrode 200 may be formed by a plating process or a depositing process using a sputter. Meanwhile, in the case in which the driving electrode 200 is made of copper (Cu), a surface of the driving electrode 200 may be black-oxide treated. Here, the black-oxide treatment indicates treatment in which $Cu_2O$ or $CuO$ is precipitated by oxidizing the surface of the driving electrode 200, wherein the $Cu_2O$ is brown and is thus referred to as a brown oxide and the $CuO$ is black and is thus referred to as a black oxide. As described above, the surface of the driving electrode 200 is black-oxide treated to prevent light from being reflected, thereby making it possible to improve visibility of the touch panel.

Meanwhile, the driving electrode 200 may also be formed using metal silver formed by exposing/developing silver salt emulsion layer, a metal oxide such as an indium thin oxide (ITO), or the like, a conductive polymer such as poly-3, 4-ethylenedioxythiophene/polystyrenesulfonate (PEDOT/PSS), or the like, having excellent flexibility and a simple coating process, in addition to the above described metal.

The driving electrode 200 may be formed using an indium tin oxide (ITO), PEDOT/PSS, a carbon nanotube (CNT), a graphene, a zinc oxide (ZnO), an Al-doped zinc oxide (AZO), or the like.

The sensing electrode 300 is formed to include the third member 310 formed in a direction corresponding to the first member 210 of the driving electrode 200 and the fourth member 320 extended to the inner portion of the spaced space between the second members 220 in one side direction perpendicular to one direction in which the third member 310 is formed.

As shown in FIG. 1, the sensing electrode 300 may be complementally inserted into the spaced space between the second members 220 of the driving electrode 200 so as to be patterned together with the driving electrode 200 which is described in order to implement the touch panel having the single layer structure. The first member 210 and the second member 220 of the driving electrode 200 and the third member 310 and the fourth member 320 of the sensing electrode 300 are coupled to each other, and at least one unit body 10 including the ground electrode 400 and an inner wiring 500 to be described below at one side thereof are continuously coupled to each other, such that one touch panel may be formed. Since the sensing electrode 300 also has the same material and characteristics as the driving electrode 200, an overlapped detailed description thereof will be omitted.

Since the sensing electrode 300 and the driving electrode 200 are each driven as an independent channel, it is preferable to form the sensing electrode 300 and the driving electrode 200 in a mutual insulated state. A method of insulating the sensing electrode 300 and the driving electrode 200 may insulate the sensing electrode 300 and the driving electrode 200 by forming the spaced space on the base substrate 100 as shown in FIG. 1 and by forming a separate insulating pattern (not shown). Particularly, in the case in which the sensing electrode 300 and the driving electrode 200 are formed in the mesh pattern, it is possible to form the electrode pattern in which the sensing electrode 300 and the driving electrode 200 are insulated using a simple method by forming a disconnection part in which a thin metal wire is disconnected so as to be electrically insulated on the mesh pattern.

The ground electrode 400 is formed to be insulated in the other side direction of the third member 310 of the sensing electrode 300 and is provided with a protrusion part 410 corresponding to a concave part 311 formed toward the third member 310 of the sensing electrode 300, such that a coupled surface between the sensing electrode 300 and the ground electrode 400 may be formed of an inclined concave and convex part. This decreases a capacitive coupling due to the parasitic capacitance which may be generated at an unintended portion with an adjacent sensing electrode 300 to maintain uniformity of capacitance distribution, thereby making it possible to further improve accuracy of touch recognition and reliability of sensing sensitivity at the time of the driving by the inner wiring electrically connecting between the driving electrodes 200 to be described below.

Specifically, the protrusion part 410 extended to the concave part 311 of the third member 310 of the sensing electrode 300 on the ground electrode 400 is formed to have a predetermined interval, such that it prevents a width of forming the ground electrode 400 itself from being excessively widened simultaneously with spacing a distance between the inner wiring 500 and the sensing electrode 300, thereby making it possible to more easily secure a sensing area of the touch panel, that is, an active area in which the touch input of a user is possible. The concave part 311 patterned at a predetermined interval to be formed at the third member 310 and the protrusion part 410 protruded from the ground electrode 400 are complementarily coupled to each other, such that the capacitive coupling due to the generation of the unintended parasitic capacitance which may be generated between the inner wiring 500 and the sensing electrode 300 by the securement of the sensing area and the driving of the driving electrode 200 may be effectively avoided.

The inclined concave and convex part means a shape in which the concave part 311 formed toward an inner side which is one side direction of the third member 310 of the sensing electrode 300 and the protrusion part 410 protruded from the ground electrode 400 corresponding to the concave part 311 are complementarily coupled to each other. Here, the concave part 311 and the protrusion part 410 have a narrow width toward the inner direction of the third member 310 as shown in FIG. 1 and the protrusion part 410 of the ground electrode 400 is also formed to have a narrow width as being extended toward the inner side of the concave part, such that the sensing area may be more effectively secured by the third member 310 which is the sensing electrode 300 as well as an electric field line between the sensing electrode 300 and the inner wiring 500 are further spaced, such that the parasitic capacitance which may be unintentionally generated is effectively decreased, thereby making it possible to also avoid the capacitive coupling.

The shape of the inclined concave and convex part is not limited thereto, but various structures may be employed as long as the structure of the concave and convex part spaces the distance of the electric field between the sensing electrode 300 and the inner wiring 500 is further spaced in order to avoid the capacitive coupling due to the generation of the undesirable parasitic capacitance between the sensing electrode 300 and the inner wiring 500 adjacent to each other through the ground electrode 400 while securing and maintaining the area of the sensing electrode 300 by inter-coupling the sensing electrode 300 and the ground electrode 400.

As shown in FIG. 1, the electrode patterns continuously formed adjacent to the ground electrode 400 are formed between the driving electrodes 200, such that the inner wiring 500 serves to drive the electrode pattern by an electrical connection between the driving electrodes 200. The inner wiring 500 may be printed using a screen printing method, a gravure printing method, an inkjet printing method, or the like. As a material of the inner wiring 500, a material composed of Ag paste or an organic Ag having excellent electrical conductivity may be used However, the material of the inner wiring 500 is not limited thereto, but may be formed using an indium tin oxide (ITO), PEDOT/PSS, a carbon nanotube (CNT), a graphene, a zinc oxide (ZnO), an Al-doped zinc oxide (AZO), or the like.

The touch screen according to the present invention may further include a protective layer (not shown) covering the driving electrode 200, the sensing electrode 300, and the ground electrode 400 formed on the base substrate 100.

The above-mentioned protective layer may be made of the same material as the base substrate 100, may be coupled by an optical adhesive by forming a contacting surface contacting a finger of the user, and may be formed by a laminating method in the case in which it is configured of a film substrate.

FIG. 2 shows a cross-sectional view showing the capacitive touch screen having the single layer electrode structure according to the preferred embodiment of the present invention and shows the electric field lines generated when being driven by a stimulation signal generated between the electrodes (the driving electrode 200, sensing electrode 300, and ground electrode 400) made of a conductive material.

The electric field line of the electrodes generates edge electric field areas between the electrodes when being driven by the stimulation signal. A part of the electric field lines generally includes a short-range electric field line A which does not come out of a cover glass and is not significantly affected by the finger appearing at the cover glass or thereabouts and a long-range electric field line B in which comes out of the cover glass or is blocked by the finger.

According to the preferred embodiment of the present invention, a sensing electrode 300 formed of a metal mesh electrode and a ground electrode 400 adjacent to the sensing electrode 300 have a mutually inclined concave and convex part toward the sensing electrode 300 and the sensing electrode 300 forms an interdigit structure with an adjacent driving electrode 200 using the same method in a mutual capacitive type together configuring the driving electrode 200 and the sensing electrode 300 on a single electrode layer using a method in which one electrode group divides a counterpart electrode and each of the divided electrodes is wired by a separate inner connection wiring so as to be connected to one another at the outside of a view area in a matrix structure in which a plurality of electrodes are arranged to be intersected with each other on the base substrate 100, such that capacitive coupling caused by a generation of a undesirable parasitic capacitance between short-range electric field lines is decreased, thereby making it possible to secure uniformity of capacitance distribution.

As described above, when the electrodes are stimulated, both of the short-range electric field line A and the long-range electric field line B are present. Therefore, the undesirable mutual capacitance change between the driving and sensing lines may be decreased by depending on the mutual capacitance (the long-range electric field line B) which is changed by the touch, that is, allowing the long range electric field line B to be affected by the stimulation signal, instead of minimizing an amount of the mutual capacitance (the short-range electric field line A) which is not affected by the touch.

According to the capacitive touch screen having a single layer electrode structure according to the preferred embodiment of the present invention, a sensing electrode formed of a metal mesh electrode and a ground electrode adjacent to the sensing electrode employ a ground wiring having a mutually inclined concave and convex part toward the sensing electrode in a mutual capacitive type together configuring the driving electrode and the sensing electrode on a single electrode layer using a method in which one electrode group divides a counterpart electrode and each of the divided electrodes is wired by a separate inner connection wiring so as to be connected to one another at the outside of a view area in a matrix structure in which a plurality of electrodes are arranged to be intersected with each other on a base substrate, such that a capacitive coupling due to a parasitic capacitance which may be generated by short-range electric field lines is decreased, thereby making it possible to maintain uniform capacitance distribution.

Further, according to the capacitive touch screen having a single layer electrode structure according to the preferred embodiment of the present invention, the sensing electrode forms an interdigit structure using the same method as an adjacent driving electrode, such that undesirable capacitive coupling with the inner wiring is effectively blocked.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A touch panel, comprising:
    a base substrate;
    a driving electrode including a first member formed on the base substrate in one direction and second members each extended in a direction perpendicular to one direction of the first member and formed to be spaced apart from each other in one direction;
    a sensing electrode including a third member formed on the base substrate in a direction corresponding to the first member and a fourth member extended to an inner portion of a spaced space between the second members in one side direction perpendicular to one direction in which the third member is formed; and
    a ground electrode formed on the base substrate in the other side direction of the third member so as to be in parallel with the direction in which the third member is formed and having a mutually inclined concave and convex part formed at a surface thereof corresponding to the third member.

2. The touch panel as set forth in claim 1, wherein the inclined concave and convex part includes:
    a concave part formed toward an inner side of one side direction of the third member; and
    a protrusion part protruded from the ground electrode so as to correspond to the concave part.

3. The touch panel as set forth in claim 2, wherein the concave part is formed to have a width that becomes narrower toward the extension direction of the fourth member, and the protrusion part is formed to have a width that becomes narrower toward a direction in which it is inserted into the concave part so as to correspond to the concave part.

4. The touch panel as set forth in claim 1, further comprising:
    a protrusion protruded to have a width smaller than an extension width of the second member in a direction in which the second member is extended; and
    a concave part formed toward an inner side of the first member so as to correspond to the protrusion.

5. The touch panel as set forth in claim 1, further comprising an inner wiring formed at one side of the ground electrode and formed at the other side of the third member in one direct in which the third member is formed.

6. The touch panel as set forth in claim 5, wherein the inner wiring is formed by printing using an Ag paste.

7. The touch panel as set forth in claim 1, wherein the sensing electrode and the driving electrode are formed in a mesh pattern.

8. The touch panel as set forth in claim 7, wherein the mesh pattern is made of copper (Cu), aluminum (Al), gold (Au), silver (Ag), titanium (Ti), palladium (Pd), chromium (Cr), or a combination thereof.

9. The touch panel as set forth in claim 7, wherein the mesh pattern includes a disconnection part for electrically insulating between the sensing electrode and the driving electrode.

10. The touch panel as set forth in claim 1, wherein the base substrate uses any one of polyethylene terephthalate (PET), polycarbonate (PC), poly methyl methacrylate (PMMA), polyethylene naphthalate (PEN), polyethersulfone (PES), a cyclic olefin polymer (COC), a triacetylcellulose (TAC) film, a polyvinyl alcohol (PVA) film, a polyimide (PI) film, polystyrene (PS), biaxially oriented polystyrene (BOPS; containing K resin), glass, or tempered glass.

11. The touch panel as set forth in claim 1, wherein the sensing electrode and the driving electrode include insulating patterns formed to be spaced apart from each other so as to be insulated therebetween.

12. The touch panel as set forth in claim 1, wherein a sensing electrode and a driving electrode having the same patterns as those of the sensing electrode and the driving electrode are formed at the other side of the ground electrode based on the inner wiring, and the inner wiring is formed to be electrically connected to the driving electrode having the same pattern.

\* \* \* \* \*